US 8,365,116 B2

(12) United States Patent
Stevens et al.

(10) Patent No.: US 8,365,116 B2
(45) Date of Patent: Jan. 29, 2013

(54) CYCLE CUTTING WITH TIMING PATH ANALYSIS

(75) Inventors: Kenneth S. Stevens, Brighton, UT (US);
Vikas Vij, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 51 days.

(21) Appl. No.: 12/961,355

(22) Filed: Dec. 6, 2010

(65) Prior Publication Data

US 2012/0144359 A1     Jun. 7, 2012

(51) Int. Cl.
*G06F 17/50*     (2006.01)
*G06F 11/22*     (2006.01)

(52) U.S. Cl. .......................... 716/108; 716/134; 716/136

(58) Field of Classification Search ......................... None
See application file for complete search history.

(56) References Cited

U.S. PATENT DOCUMENTS

| | | | |
|---|---|---|---|
| 6,012,836 A * | 1/2000 | Mangelsdorf | 703/6 |
| 6,237,127 B1 * | 5/2001 | Craven et al. | 716/108 |
| 6,658,635 B1 * | 12/2003 | Tanimoto | 716/108 |
| 7,203,919 B2 * | 4/2007 | Suaris et al. | 716/108 |
| 7,284,219 B1 * | 10/2007 | Manaker et al. | 716/108 |
| 7,437,697 B2 | 10/2008 | Venkateswaran et al. | |
| 7,584,443 B1 * | 9/2009 | Govig et al. | 716/113 |
| 7,607,118 B1 | 10/2009 | Hutton | |
| 7,814,451 B2 * | 10/2010 | Furnish et al. | 716/100 |
| 8,141,015 B1 * | 3/2012 | Govig et al. | 716/108 |
| 2006/0200786 A1 | 9/2006 | Chang | |
| 2009/0210841 A1 | 8/2009 | Prakash et al. | |
| 2011/0004858 A1 * | 1/2011 | Chang et al. | 716/122 |

OTHER PUBLICATIONS

John Backes et al., 'The Analysis of Cyclic Circuits With Boolean Satisfiability', Department of Electrical and Computer Engineering, University of Minnesota.
'Basic Asynchronous Circuit Design', 9.1 Introduction.
Riedel et al., 'Timing Analysis of Cyclic Combinational Circuits', California Institute of Technology.
'Delay Calculation', Wikipedia Aug. 18, 2010; en.wikipedia.org/wiki/Delay_calculation.
'Static Timing Analysis' Wikipedia Aug. 18, 2010; en.wikipedia.org/.../Static_timing_analysis.
Osama Neiroukh et al., 'An Efficient Algorithm for the Analysis of Cyclic Circuits', Intel, Columbia University, Portland State University, 2006.
International Search Report and Written Opinion dated Mar. 7, 2012 for PCT/US2011/061589.

* cited by examiner

*Primary Examiner* — A. M. Thompson
(74) *Attorney, Agent, or Firm* — Stoel Rives LLP

(57) ABSTRACT

The timing cycles in a circuit design are identified and cut such that timing constraint paths in the circuit design are preserved. Timing cycles in the circuit design may be identified by traversing an adjacency list data structure, in which elements of the circuit design are represented as vertices interconnected by edges. Timing constraint paths may be distinguished from false timing paths using timing analysis, such as a greatest common path heuristic. Timing constraint paths may be marked as "constrained" to prevent these paths from being cut. With the cycles and timing constraint paths identified, cuts may be selected that cut the identified timing cycles while preserving the timing constraint paths. The cycle cuts allow the circuit design to be correctly processed within a conventional CAD tool design flow.

18 Claims, 6 Drawing Sheets

CYCLE CUTTING WITH TIMING PATH ANALYSIS

TECHNICAL FIELD

This disclosure relates to processing cyclical circuit designs, in particular, to cycle cutting using timing path analysis.

BACKGROUND

Asynchronous design methodologies are used to create high-performance, low-power circuit topologies. For instance, asynchronous controllers based on reactive sequential controllers only clock the datapath when new data tokens are present. The power consumption and/or performance of such circuits can be significantly improved by correctly sizing circuit elements through timing driven optimization processes. Such optimization processes are particularly effective for asynchronous controllers since the controller is used as a local timing reference to determine the frequency of the design; for example, the controller produces the high-power clock signal that drives components of the data path for bundled data asynchronous controller designs (e.g., latches, flip flops, and so on).

The sequential controllers described above include cyclic timing paths (referred to generally as "cycles"). As used herein, a "cycle" refers to any circuit topology in which a circuit element has an input that is formed from one or more circuit outputs. A cycle may comprise any number of intervening circuit elements, including, but not limited to: transistors, gates, latches, signal paths, buffers, and so on.

Circuit designs comprising cycles, such as the sequential controllers described above, may be generated using conventional circuit design tools, such as Computer-Aided Design (CAD) tools, Application Specific Integrated Circuit (ASIC) CAD tools, VHDL editors, Verilog editors, or the like. These tools, however, are unable to perform certain processing functions on cyclic circuit designs. These functions may include, but are not limited to: timing optimization processes, element sizing, layout, signal routing, and so on. Rather, the tools may be capable of performing these functions only on acyclic circuit designs that can be represented as a directed acyclic graph (DAG). Accordingly, what is needed are systems and methods for cutting cycles in cyclic circuits so they can be represented as a DAG and be correctly processed by CAD tool flows.

SUMMARY

In exemplary embodiments described below, the timing cycles in a cyclic circuit design is analyzed to identify and cut the timing cycles therein, such that the design can be correctly processed using a CAD tool flow. Cutting the timing cycles may comprise identifying the cycles in the circuit, identifying cycle cuts that preserve the timing constraints of the design, and generating a set of directives implementing the identified cuts. As discussed below, a circuit timing constraint may be satisfied by a number of different timing paths through the circuit design. Some of these timing paths may be "false" timing paths that can be cut without changing the operation of the circuit. The false timing paths are identified using a "greatest common path" heuristic. The cycle cuts are made while preserving the actual timing constraint paths.

BRIEF DESCRIPTION OF THE DRAWINGS

Non-limiting and non-exhaustive embodiments of the disclosure are described, including various embodiments of the disclosure with reference to the figures, in which.

In the following description, numerous specific details are provided for a thorough understanding of the various embodiments disclosed herein. However, those skilled in the art will recognize that the systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

As described above, cyclical circuit designs may form the basis of high-performance, low-power systems. However, cyclical circuit designs cannot be correctly processed through conventional tool flows without first cutting the timing cycles therein. As used herein, the terms "cycle cuts" or "cycle cut directives" refer to a set of constraints that cut circuit timing paths in a circuit design, such that the circuit design can be represented as a DAG and can be correctly processed in a CAD tool flow.

In some embodiments, the timing cycles of a cyclical circuit design are cut such that the functionality of the design is preserved. The cuts are configured to preserve critical timing paths and/or may be selected to prevent "orphaning" circuit elements. The cycle cuts allow the design to be correctly processed using a CAD tool flow to perform operations, such as power optimizations, element sizing, static timing analysis (STA), layout and routing, and so on. An "orphaned element" refers to an element in a circuit design that is left unsized (or cannot be properly sized by the CAD tool flow) because it has no timing paths passing from its inputs to outputs.

Figure 1:
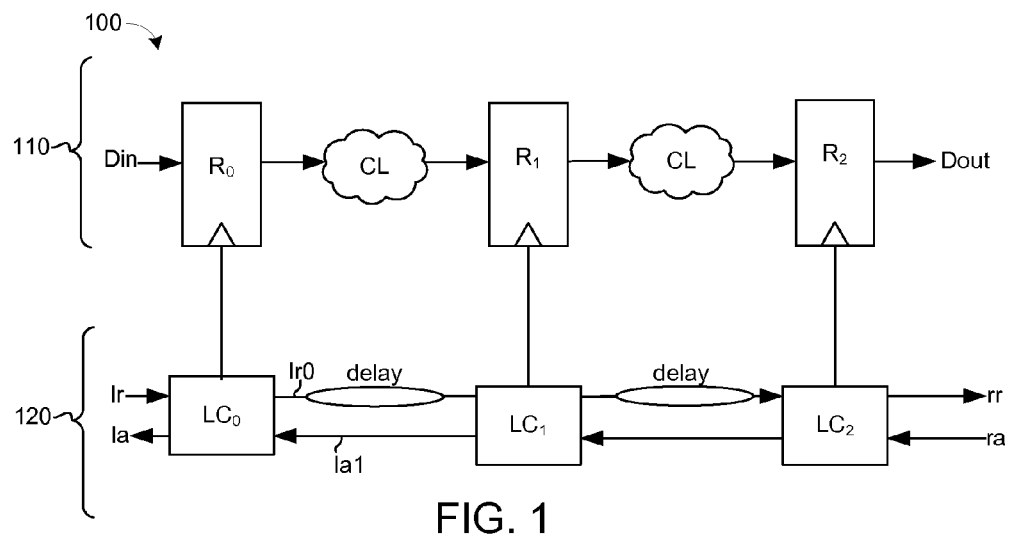
FIG. 1 is a block diagram of one example of a system comprising cyclic circuit modules.

FIG. 1 depicts one example of circuit design comprising cyclic circuit modules. In the FIG. 1 example, the circuit design 100 is a "bundled data" asynchronous linear pipeline circuit. The circuit 100 comprises a clocked datapath 110 and an asynchronous control path 120. The datapath 110 comprises acyclic combinational logic (CL) and registers (R). The control path 120 comprises linear control blocks (LC) that perform a clocking function for the design 100 using a handshake mechanism. The handshake mechanism implemented by the LC blocks generates the timing and sequencing signals for the circuit 100. The handshaking mechanism may be elastic in nature and may stall if required, such that the mechanism only clocks when new data is present. The delay elements of the control path 120 disposed between the LC blocks are used to satisfy setup and/or hold time constraints of the registers in the datapath 110.

As described above, conventional CAD tools are incapable of correctly processing cyclical circuit designs, such as the linear control blocks (LC) of FIG. 1. Accordingly, in some embodiments, the design tool flow is augmented to include a cyclical timing module to identify and cut the timing cycles in the cyclical circuit design 100 so that the design 100 can be correctly processed by the rest of the CAD tool flow.

In some embodiments, a circuit designer may designate certain "must-cut" timing paths in a design 100. A "must-cut" timing path can be designated to identify paths that form "global architectural cycles" (global cycles) that may occur when circuit designs or modules are composed together into a system, such as the system 100 of FIG. 1. For example, a global cycle is formed when $LC_0$ and $LC_1$ are connected; the global cycle includes the request signal lr0 formed by $LC_0$ and the acknowledge signal la1 formed by $LC_1$. A designer (or other entity) may designate one or more timing paths on the global cycle as "must-cut" paths to remove the global cycle. Alternatively, or in addition, the systems and methods for timing cycle identification and cutting may be applied to the circuit design 100 after the modules are connected. As described below, the systems and methods for cycle cutting disclosed herein may be configured to cut the "must-cut" timing paths.

Figure 2:
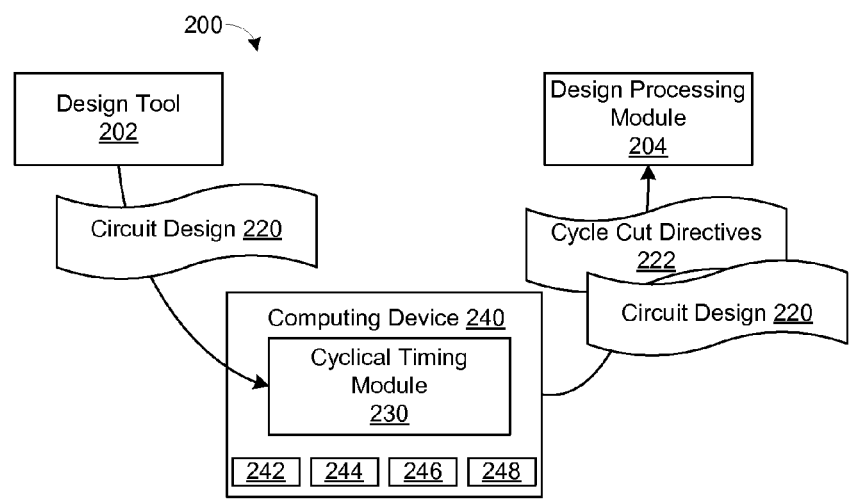
FIG. 2 depicts a design flow comprising a cyclical timing module.

FIG. 2 depicts one embodiment of a design flow 200 comprising a cyclical timing module 230. A design tool 202 may be used by a designer to generate a circuit design 220 that includes timing cycles (e.g., a cyclical circuit design). The design tool 202 may comprise any tool or tool set known in the art, including, but not limited to CAD design tools, ASIC design tools, Verilog editors or generators, VHDL design tools, or the like.

The circuit design 220 includes timing cycles, which, as described above, prevent the design 220 from being correctly processed by other portions of the design flow 200, such as the design processing module 204. The design processing module 204 performs operations including, but not limited to: power optimization, static timing analysis, element sizing (e.g., gate, transistor, and/or buffer sizing etc.), layout, routing, and so on.

The design flow 200 includes a cyclical timing module 230 that cuts the timing cycles in the circuit design 220, so that the design 220 can be correctly processed by the design processing module 204. The cyclical timing module 230 may comprise and/or be implemented on a computing device 240. The computing device 240 includes a processor 242, which may comprise one or more general-purpose processors, special-purpose processors, reconfigurable processors (e.g., FPGAs), or the like. The processor 242 is communicatively coupled to memory 244 and non-transitory machine-readable storage media 246. The storage media 246 may comprise one or more disks, non-volatile memory (e.g., solid-state storage, Flash, or the like), optical storage media, or the like. The computing device 240 may further comprise interface components 248, including, but not limited to: input/output devices (e.g., keyboard, mouse, display), communications interfaces (e.g., bus interfaces, communication interfaces, network interfaces, etc.), and so on. In some embodiments, the cyclic timing module 230 (or portions thereof) may be embodied as instructions stored on the non-transitory machine readable storage media 246. The instructions may be executable by the processor 242 to perform methods for cycle cutting with timing path analysis as described herein (e.g., generate cycle cut directives 222).

The cyclical timing module 230 cuts timing cycles by identifying cycles in the circuit design 220, identifying timing constraint paths in the design 220, selecting cycle cuts that preserve the identified timing constraint paths, and generating cycle cut directives 222 to implement the selected cycle cuts. The cyclical timing module 230 may implement cycle cuts using various mechanisms. The mechanism(s) used by the cyclical timing module 230 to implement the cycle cut directives 222 may depend upon the design flow 200 (e.g., the cycle cut directives 222 may be implemented using mechanisms provided by and/or configured for use by the design flow 200). For example, the cycle cut directives 222 may be implemented by: generating directives to remove timing arcs through certain elements of a circuit design and/or to disable certain timing constraints (e.g., "set_disable_timing" directives); generating timing directives on certain design elements (e.g., "set_max_delay," "set_min_delay," etc.); generating ordering directives (e.g., "set_data_check," etc.); and so on. Although particular mechanisms for specifying cycle cuts are discussed herein, the disclosure is not limited in this regard and could be adapted to use any directive and/or cycle cutting mechanism known in the art.

The cycle cuts selected by the cyclical circuit module 230 may be included in the circuit design 220 itself (not shown); the circuit design 220 (with the included cycle cut directives) may then be correctly processed by other portions of the design flow 200, such as the design processing module 204. Alternatively, or in addition, the cycle cut directives (or other modifications) may be expressed in a separate cycle cut directives data structure or file 222, which may be provided to other portions of the design flow 200 (e.g., design processing module 204) along with the circuit design 220. In some embodiments, the cycle cut directives 222 may be embodied as a set of timing constraints for the circuit design 220.

The cyclical timing module 230 selects cycle cuts that do not affect critical timing paths in the design 220, modify the logic of the design 220, and/or adversely affect the operation and/or correctness of the circuit design 220. In some embodiments, the cyclical timing module 230 prevents selecting cuts on timing constraint paths. In addition, the cyclical timing module 230 may be configured to prevent cuts that would result in "orphaned" circuit design 220 elements. Element sizing operations performed by the design flow 200 are used to properly size elements in the circuit design 220 (e.g., determine gate, transistor, buffer, and other element sizes). Proper element sizing may be critical for performance and/or power consumption optimizations. These operations typically determine element sizing using timing paths passing through elements in the circuit design 220. As discussed above, "orphaned" elements that do not have timing paths passing from their inputs to their outputs cannot be properly sized by the design flow 200. In some embodiments, the cyclical timing module 230 prevents orphaned elements by selecting cycle cuts that preserve at least one timing path through each element in the circuit design 220.

As described below, the cyclical timing module 230 distinguishes between "timing constraint paths" and "false timing paths" using timing analysis. The cyclical timing module 230 prevents cycle cuts that would affect the identified timing constraint paths. Sequential circuits, such as circuit design 100 of FIG. 1, may include feedback paths to maintain circuit state. These feedback paths may create timing cycles in the circuit. Since the feedback paths hold state information, changes in these signals may not cause a change in the circuit outputs. Thus, state feedback paths may be identified as "false paths" that can be cut by the cyclical timing module 230 without adversely affecting the circuit design 220. Other paths that similarly do not affect circuit outputs are also identified as "false paths." Therefore, as used herein, the term "false path" refers to a timing path that does not affect an element output (during a given timing cycle) and/or can be cut without affecting the operational characteristics of the circuit design 220. Accordingly, a "false path" is any timing path that is not a timing constraint path. Conversely, a timing constraint path may directly affect an element output. Accordingly, as used herein, a "timing constraint path" refers to a timing path that determines and/or affects a circuit output and/or any other timing path that should not be cut in a cycle cutting operation.

In some embodiments, the cyclical timing module 230 implements a "greatest common path" (GCP) heuristic to identify timing constraint paths. The GCP heuristic assumes that, in a set of timing paths that satisfy the same timing constraint, the shortest common path is the timing constraint path, and the longer paths are false paths. Accordingly, if one path is a subset of another path and the order of the elements in the longer path is the same as that of the shorter path, then the shorter path is identified as the GCP, and the longer path can be identified as a false path. The cyclical timing module 230 may maintain a list of timing constraint paths (e.g., GCP paths). False timing paths are pruned from the list and the GCP paths are retained. As will be discussed below, cycle cuts are selected such that the timing constraint paths (e.g., GCP paths) in the timing constraint path list remain connected.

Figure 3:
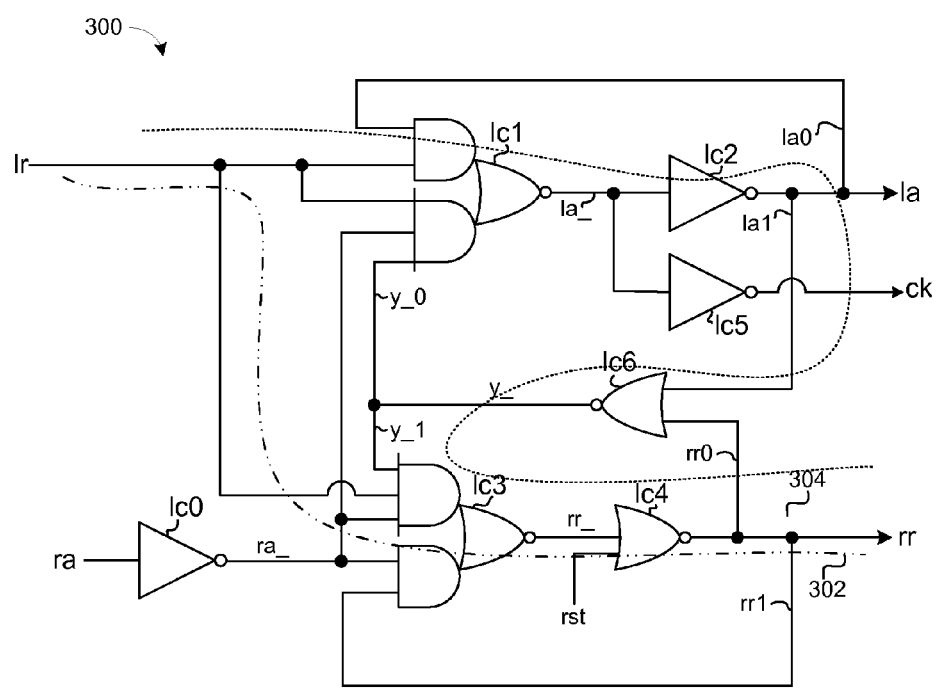
FIG. 3 is a block diagram of one example of a cyclic circuit.

FIG. 3 depicts one example of a circuit design 300 comprising one or more timing cycles. The circuit design 300 could be used as one of the linear control blocks (LC) in the circuit 100 of FIG. 1. In this example, the circuit designer defines a timing constraint to cause the circuit design 300 to generate a 2 GHz clock signal (e.g., set_min_delay 0.500 -from [get_pins lc0/lr] -to [get_pins lc1/lr]). This timing constraint results in a timing path between a first pin lr to a second pin rr. The circuit design 300 includes a first cycle comprising elements lc3, lc4, and lc3 (denoted [lc3, lc4, lc3]) and a second cycle comprising elements lc3, lc4, lc6, and lc3 (denoted [lc3, lc4, lc6, lc3]). The first and the second cycles overlap one another and have lc3 and lc4 as shared elements.

There are two timing paths that satisfy the timing constraint between lr and rr. a first path 302 that includes elements lc3 and lc4; and a second path 304 that includes elements lc1, lc2, lc6, lc3, and lc4. The first path 302 is a subset of the second path 304 and, as such, is identified as the timing constraint path per the GCP heuristic described above. The second path 304 is, therefore, identified as a false path that can be cut in a cycle cutting operation. The first path 302 is marked to prevent the path 302 from being cut during cycle cutting operations. As discussed below, marking a path as "constrained" includes marking the inputs of the circuit elements on the path, which prevents these inputs from being selected for cutting. The inputs of the elements that are not in the GCP are not marked as constrained, and, as such, are available for cutting. The selection of cut points is based on, inter alia, whether elements and/or edges (e.g., connections between elements) are marked as "constrained."

Referring back to FIG. 2, the cyclic timing module 230 analyzes the circuit design 220 to identify cycles, identifies timing constraint paths in the circuit design 220 using the GCP timing path analysis described above, selects cycle cuts that preserve the identified timing constraint paths, and implements the cuts by generating corresponding cycle cut directives 222.

In some embodiments, the cyclic timing module 230 identifies cycles in the circuit design 220 using an adjacency list data structure in which elements of the circuit design 220 are represented as a set of "vertices" interconnected by "edges." Although a list data structure is described herein, other embodiments may utilize other types of data structures, and as such, the disclosure should not be read as limited in this regard. Circuit elements of the design 220 are represented as vertices in the adjacency list data structure; accordingly, vertices may represent inputs, outputs, pins, buffers, gates, transistors, components, or the like. A vertex may be expressed as a tuple comprising a vertex name (e.g., pin or element name), a list of inputs, a list of outputs, and references to one or more edges. Edges reference connections between elements of the design 220; each edge references a specific input pin of an element and may include references to link multiple pins together due to fanout. An edge may also be expressed as a tuple in the adjacency list data structure, each vertex tuple comprising a reference to a successor vertex, an identifier of the input on a gate master, and a pointer to connected edges (e.g., references to other edges that are connected to the edge). The adjacency list data structure comprises a vertex for each primary circuit input and element and an edge for each element input.

Figure 4:
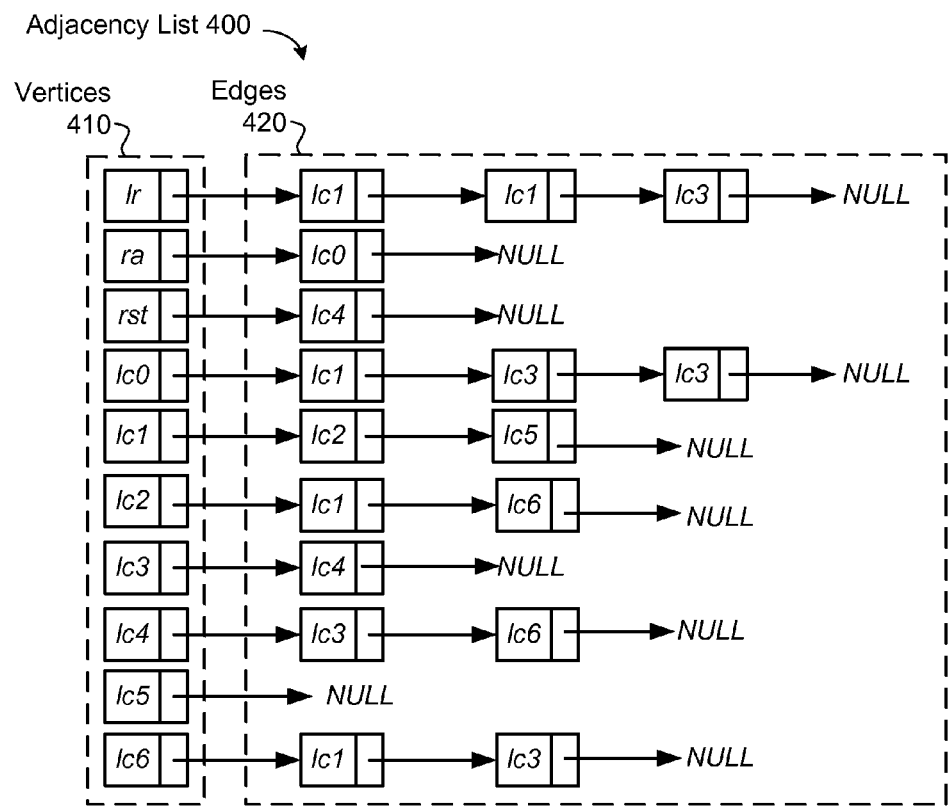
FIG. 4 depicts an example of an adjacency list data structure.

FIG. 4 depicts one example of an adjacency list data structure 400 for the circuit design 300 of FIG. 3. The vertices of the adjacency list data structure 400 are represented in column 410. Edges associated with each vertex in column 410 are represented in respective rows 420. The adjacency list data structure 400 of FIG. 4 includes a vertex 410 for each input and/or element in the circuit design 300 and an edge for each element input.

The cycles in the circuit are identified by traversing the adjacency list data structure (or circuit design 220). For example, a depth first search of each vertex 410 in the data structure 400 may be implemented to find paths that "loop back" to a particular vertex (e.g., paths that include to vertex and that eventually return to the vertex). If such a path exists, then the path is identified as a cycle and is included in a "cycles" data structure (e.g., list or table). Table 1 shows the cycles identified in the circuit design 300 of FIG. 3.

TABLE 1

| Cycle 1 | lc1 lc2 lc1 |
| Cycle 2 | lc1 lc2 lc6 lc1 |
| Cycle 3 | lc3 lc4 lc3 |
| Cycle 4 | lc3 lc4 lc6 lc3 |

The first cycle (cycle 1) is identified by traversing from the vertex lc1, to lc2, and then back to lc1, forming a cycle. The other cycles may be similarly identified; cycle 2 is identified by traversing from vertex lc1 to lc2, from the vertex lc2 to lc6 (through lc1), and from the vertex lc6 back to lc1.

Circuit designs typically include timing constraints. As discussed above, timing constraints can be expressed in terms of a first element and a second element (e.g., first and second pins) and may be specified by the circuit designer and/or automatically determined by the cyclical timing module 230 (or other portions of the design flow 200). For example, the circuit design 300 of FIG. 3 includes three timing constraints: a first timing constraint between lr and la, a second timing constraint between lr and rr, and a third timing constraint between ra and la. Each timing constraint is satisfied by a respective set of timing paths through the circuit design 300. As described above, in a set of timing paths satisfying a particular timing constraint, one path (or potentially more) is identified as the timing constraint path, whereas others are identified as "false" timing paths that can be cut without affecting the operation of the circuit design. In some embodiments, the timing constraint paths are identified using the GCP heuristic described above. Table 2 shows the set of timing paths that satisfy the timing constraint between lr and rr in the circuit design 300:

TABLE 2

| lr→rr | lc3 lc4 |
|---|---|
|  | lc1 lc2 lc6 lc3 lc4 |

Applying the GCP heuristic, the shortest common path [lc3 lc4] is identified as the timing constraint path in the set, and the longer timing path [lc1 lc2 lc6 lc3 lc4] is identified as a false timing path. The cyclical timing module 230 marks the inputs of the elements in the timing constraint path as "constrained," whereas inputs of elements not on the timing constraint path are not so-marked and, as such, are available for cycle cutting. Marking a timing constraint path may comprise traversing the timing constraint path and marking the inputs of the elements in the path as "constrained" in a data structure (e.g., in the adjacency list data structure, or in Table 4 described below). Marking may further comprise including the path in a timing constraint path list.

A list of the timing constraint paths (GCPs) for the three timing constraints lr→la, lr→rr, and ra→la is illustrated in Table 3:

TABLE 3

| lr→la | lc1 lc2 |
|---|---|
| lr→rr | lc3 lc4 |
| ra→la | lc0 lc1 lc2 |

With the cycles and timing constraint paths identified, the cyclic timing module 230 selects an appropriate set of cycle cuts that are configured to cut the identified cycles (e.g., as identified in Table 1) while maintaining the timing constraint paths (e.g., as identified in the timing constraint paths of Table 3).

In some embodiments, the number of cuts that are required to cut all of the timing cycles in the circuit design can be minimized by treating the selection of circuit cuts as a "covering problem." In this approach, a table data structure (or an equivalent) is constructed in which the rows represent timing cycles in the design, and the columns represent edges. The edges are selected for cutting based upon how many cycles would be cut by the edge. Edges that are marked as "constrained" (e.g., are inputs to elements on one of the timing constraint paths of Table 3) are excluded from selection (e.g., may not be included in the Table 4, or may be marked so as to be removed from consideration):

TABLE 4

|  | Edges | | | | | | | |
|---|---|---|---|---|---|---|---|---|
| Cycles | la__ | la0 | la1 | y0 | rr__ | rr0 | rr1 | y__1 |
| 1 [lc1 lc2 lc1] | X | X |  |  |  |  |  |  |
| 2 [lc1 lc2 lc6 lc1] | X |  | X | X |  |  |  |  |
| 3 [lc3 lc4 lc3] |  |  |  |  | X | X |  |  |
| 4 [lc3 lc4 lc6 lc3] |  |  |  |  | X |  | X | X |

In Table 4, edge subscripts are used to identify edge fanout (e.g., edges forking into two paths). For example, and as shown in FIG. 3, la0 represents the edge connecting the output of lc2 to lc1, and la1 represents the edge connecting the output of lc2 to lc6. Similarly, y_0 represents the edge connecting the output of lc6 with lc1, and y_1 represents the edge connecting the output of lc6 to lc3. The edges rr0 and rr1 represent the output of lc4 flowing to lc6 and lc3, respectively. Although not shown in Table 4, the data structure could include "must-cut" timing paths corresponding to global cycles, such as the global architectural cycles described above in conjunction with FIG. 1.

The markings ("X") in the table indicate that cutting a particular edge will result in cutting the corresponding cycle. Edges that are on timing constraint paths and/or are marked as "constrained" are removed from consideration. Accordingly, the columns representing la_and rr_are removed from consideration, since, as described above, these edges are on the timing constraint paths (e.g., the GCP) of the timing constraints lr→la and lr→rr.

The cyclic timing module 230 iterates over the covering table data structure (table 4) to select edges having the most cycle connectivity (e.g., edges that if cut would result in cutting the most cycles). When an edge is cut, the corresponding column is removed from the table, reducing the search space for subsequent iterations. The iterating may continue until all the cycles and/or must-cut timing paths have been cut and/or all non-constrained edges have been exhausted.

In some embodiments, the selection of an edge for cutting comprises determining whether the selected cut will result in an "orphaned" element (e.g., will result in cutting the only timing arc passing through the element). As described above, each element may need at least one timing arc in order to be properly sized (e.g., by the design processing module 204). Accordingly, if a cut would sever the only remaining timing path through a particular element, a different edge may be selected (if possible) and/or other edges resulting in the fewest number of orphaned elements may be selected.

As discussed above, in some embodiments, the circuit design may designate edges that must be cut ("must-cut" paths). For instance, referring back to FIG. 1, adjacent controllers $LC_0$ and $LC_1$ may form a global cycle between the request lr0 and acknowledge la1 signals. This global cycle and/or one or more of its constituent edges may be designated as "must-cut." The "must-cut" edges are cut using the cycle cutting techniques described above. For instance, the "must-cut" paths or edges may be included in the covering data structure (Table 4). In some embodiments, the "must-cut" paths are prioritized in the selection process to reduce the chance that they will be prevented from being cut due to a lack of available cut locations and/or the "orphaning" issues described above.

Referring back to FIG. 2, cutting a cycle may comprise generating a directive to disable timing on a particular edge and/or through a particular element in the circuit design 220. The cycle cut directives may be provided as a separate data structure or file (e.g., cycle cut directives 222), may be included in the circuit design 220 itself, or the like. The cycle cut directives 222 and the circuit design 220 are provided to other portions of the design flow 200 for further processing.

Certain circuit configurations (e.g., timing constraints and/or element sizing requirements) may preclude automated cutting of all the cycles in the circuit design 220; it may be impossible to cut all of the cycles in the circuit design without either cutting a timing constraint path and/or orphaning one or more elements. In some embodiments, the cyclical timing module 230 generates a "quality metric" to indicate the quality of the processing achieved by the cyclical timing module 230. The quality metric is based upon the number of cycles remaining in the circuit design 220 after processing (if any), the number of must-cut paths that remain uncut (if any), and/or the number of orphaned elements (if any). An optimal quality rating (e.g., high quality rating) indicates that all of the cycles and/or must-cut paths were cut and/or no elements are orphaned. Conversely, a low quality rating indicates that some cuts were not made and/or the cuts resulted in orphaned elements (e.g., some design elements cannot be properly sized). The quality metric may also quantify the number of cuts required to remove the circuit cycles; implementations that minimize the number of cuts may be assigned a higher quality than implementations that use more cuts.

In some embodiments, when all the cycles and/or must-cut paths identified in the circuit design 220 cannot be cut (e.g., and a low quality rating results), the cyclical timing module 230 notifies the circuit designer. The notification may indicate the constraints and/or element sizing requirements resulting in the poor quality rating. In response, the circuit designer may modify the circuit design 220 (e.g., timing constraints, etc.) in such a way that more of the cycles can be cut. Accordingly, the notification may include suggestions for modifications to the circuit design 220. For example, the notification may identify the cycles that could not be cut, may identify the timing constraints preventing the cycles from being cut, may identify the elements that would be orphaned by the cuts, and so on.

Alternatively, or in addition, the cyclical timing module 230 may be configured to iterate over the design; in each iteration, the cyclical timing module 230 performs one or more automated modifications to the circuit design 220 and then re-implements the timing path analysis techniques described above to determine whether the modifications result in a higher quality metric (e.g., result in cycle cut directives 222 that allow the design 220 to be represented as a DAG and be correctly processed by the processing module 204). Each iteration may further comprise verifying that the modifications did not change the functionality and/or behavior of the circuit design 220.

For example, in some embodiments, the cyclical timing module 230 segments the circuit design 220 into one or more partitions. The cyclical timing module 230 implements cycle cutting on each of the partitions and then attempts to combine the partitions into a complete, circuit design 220. The segmentation may be performed according to various heuristics (e.g., by size, by complexity, by number of cycles, etc.). In another example, the cyclical timing module 230 removes and/or modifies one or more timing constraints of the circuit design 220. The circuit design 220 (with the modified timing constraints) may be analyzed as described above. The iterating may further include the cyclical timing module 230 allowing one or more elements to be orphaned. The orphaned elements may be sized according to a sizing heuristic implemented by other portions of the design flow 200.

Some circuit designs 220 may comprise nested cycles (e.g., composite cycles). A nested cycle comprises two cycles that share one or more common elements. The cyclical timing module 230 may be configured to decompose the nested cycle by, inter alia, segmenting the circuit design 220 into one or more partitions as described above. Alternatively, or in addition, the cyclical timing modules 230 may segment the nested cycle into a series of timing constraint paths covering the nested cycle. This timing path segmentation may comprise segmenting the nested cycle at (or near) shared elements of the nested cycles.

In some embodiments, the cyclical timing module 230 implements a modified GCP heuristic to identify the timing constraint paths. The GCP heuristic described above may not hold for all types of circuit designs. For example, some asynchronous circuit designs remove timing constraints by sequencing state changes, such that output changes are delayed until the state variables have settled, resulting in slow controller response time. The GCP heuristic may result in incorrect delays, which may negatively impact design correctness. For such designs, the timing paths may be defined in a way that they pass through the feedback logic elements to ensure that the timing paths are not selected for cutting. These timing paths may be specified by the designer of the circuit design 220 and/or may be automatically determined by the cyclical circuit module 230 as described above.

Figure 5:
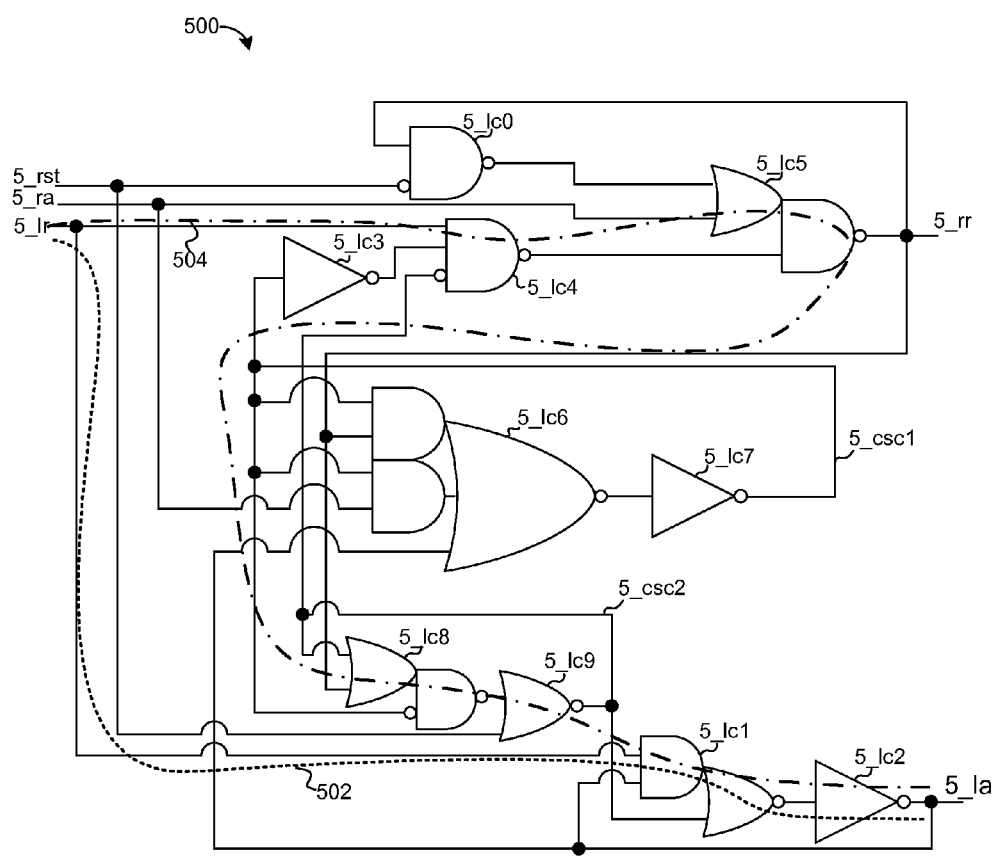
FIG. 5 is a block diagram of another example of a cyclic circuit.

FIG. 5 depicts another example of a cyclical circuit design 500. In the FIG. 5 example, the circuit designer has specified a timing constraint between $5\_lr$ and $5\_la$. The timing path between $5\_lr$ and $5\_la$ comprises two paths: path 502 comprising elements $5\_lc1$ and $5\_lc2$; and path 504 comprising elements $5\_lc4$, $5\_lc5$, $5\_lc8$, $5\_lc9$, $5\_lc1$, and $5\_lc2$. Path 502 is identified as the critical timing path per the GCP heuristic. However, in the reset state (e.g., when $5\_rst$ is asserted), $5\_la$ is logic low, and therefore $5\_lr$ does not assert 51a since it is a non-controlling input of the element $5\_lc1$ (e.g., $5\_lr$ is combined in AND logic in element $5\_lc1$). Accordingly, $5\_la$ is set via the non-GCP path 504. The causal path for this timing path first asserts $5\_rr$, then the state variable $5\_csc2$, which then asserts the output $5\_la$. This alternative path may be noted by the circuit designer and/or automatically detected by the cyclical timing module 230 (e.g., while traversing the circuit design 500 to build an adjacency list data structure, perform formal verification functions or the like).

In some embodiments, the cyclical timing module 230 modifies the GCP heuristic and/or the circuit design 500 timing constraints to prevent the path 504 from being selected for cutting. As illustrated in FIG. 5, path 504 may be decomposed into three separate timing constraints: a first timing constraint $5\_lr \rightarrow 5\_rr$, a second constraint $5\_rr \rightarrow 5\_csc2$, and a third constraint $5\_csc2 \rightarrow 5\_la$. These timing constraints may replace the timing constraint $5\_lr \rightarrow 5\_la$ that they cover. The modified timing constraints prevent the non-GCP path 504 from being selected for cutting per the GCP heuristic. As discussed above, the modifications to the timing constraint paths described above may be implemented by a designer of the circuit 500 and/or implemented automatically by the cyclical timing module 230.

Figure 6:
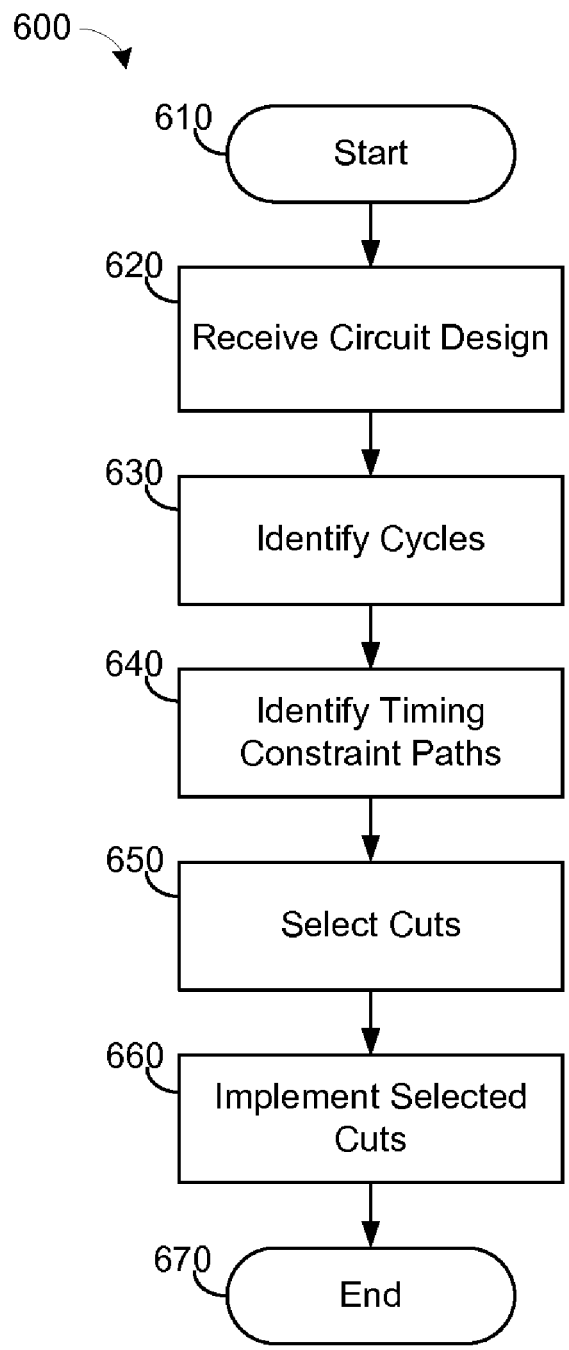
FIG. 6 is a flow diagram of one embodiment of a method for cycle cutting with timing path analysis.

FIG. 6 is a flow diagram of one embodiment of a method 600 for processing a cyclic circuit design using timing path analysis. The method 600 may be embodied as one or more computer- and/or machine-readable instructions stored on a non-transitory storage medium, such as a disk, optical media, non-volatile memory, solid-state memory (e.g., Flash memory), EEPROM, or the like, such as the non-transitory machine-readable storage medium 246 of FIG. 2. Steps of the method 600 may be implemented using machine components, such as a processor, communication interfaces, and the like. Accordingly, steps of the method 600 may be tied to a particular machine and/or to particular machine components.

At step 610, the method 600 may start and be initialized. Step 610 may comprise loading one or more machine-readable instructions from a non-transitory storage medium, initializing machine resources, and the like.

At step 620, the method 600 receives a circuit design for analysis. The circuit design comprises a plurality of elements interconnected by edges (e.g., inputs, outputs, etc.). In some embodiments, the circuit design comprises timing constraints defined by the circuit designer, each referencing a timing constraint between two or more elements in the circuit design (e.g., pins, gates, transistors, buffers, or the like).

At step 630, cycles in the circuit design are identified. Identifying the cycles in the circuit design may comprise traversing the circuit design to identify paths that visit the same element twice (e.g., start and/or traverse a first element, and return to the first element).

In some embodiments, step 630 comprises generating an adjacency list data structure (e.g., such as the adjacency list data structure 400 of FIG. 4). As described above, the adjacency list data structure generated at step 630 includes plurality of vertices, each representing a respective circuit element, and a plurality of edges, each representing element connections (e.g., element inputs, outputs, etc.). Cycles are identified by traversing adjacency list data structure as described above. The cycles identified at step 630 may be included in a cycle data structure. Each entry in the cycle data structure may list the elements comprising the cycle.

Step 630 may further comprise accessing "must-cut" path designations associated with the design. The must-cut paths may be treated as cycles that must be cut in order to correctly process the circuit design.

At step 640, timing constraint paths are identified. Step 640 comprises accessing timing constraints (if any) associated with the circuit design received at step 620. For each of the timing constraints, a set of timing paths that satisfy the constraint are determined. Within the set of identified timing paths, the "actual" timing constraint path is identified using the GCP heuristic (or variant) described above. Accordingly, step 640 comprises identifying, within a set of timing paths satisfying a timing constraint, the GCP timing path and marking inputs of the elements of the GCP path as "constrained" as described above.

In some embodiments, step 640 includes modifying the GCP heuristic and/or timing constraints to account for designs in which the GCP heuristic does not hold (e.g., as in circuit 500 of FIG. 5). As described above, modifying the GCP heuristic may comprise identifying a feedback (or similar) path, segmenting the path into one or more constituent timing constraints, and using the new and/or modified timing constraints to identify the timing constraint paths.

At step 650, cycle cuts are selected to cut the cycles and/or must-cut paths identified at step 630 while preserving the timing constraint paths identified at step 640. Accordingly, edges marked and/or identified as "constrained" are precluded from being included in cycle cuts. In some embodiments, step 650 comprises generating a "covering" data structure, such as Table 4 described above. The cycles and/or must-cut paths identified at step 630 are represented in the covering data structure as rows, and the edges of the circuit design are represented as columns. The data structure may indicate which cycles a particular edge cuts. Edges having the highest number of cycle cuts may be preferred in the selection to reduce the total number of cuts required to remove the timing cycles and/or must-cut paths. Accordingly, at step 650, the data structure may be searched to find unconstrained edges having the highest degree of cycle connectivity. Alternatively, or in addition, step 650 may comprise identifying and prioritizing cycle cuts comprising edges marked as "must-cut." The method 600 may iterate over each of the cycles and/or edges in the data structure until all the cycles have been cut and/or all of the unconstrained edges have been exhausted.

At step 660, the cuts selected at step 650 are implemented as described above. Implementing a cut may comprise generating one or more directives to cause a CAD tool to disable timing through an element and/or edge in the circuit design, set timing constraints, or the like. The cycle cut directives may be included in the circuit design and/or may be provided in a separate data structure or file. Step 660 may further comprise providing the cycle cut directives (along with the circuit design) to one or more processes of a design flow, such as the design processing module 204 of FIG. 2.

In some embodiments, step 660 includes calculating a quality metric for the design. As described above, the quality metric may be based on a number of different factors, such as the number of uncut cycles remaining after step 650, the number of orphaned elements resulting from the cuts, the number of timing paths identified as "must-cut" that remain uncut, and so on. The quality metric may be communicated to the circuit designer who may make modifications to the circuit design in an attempt to increase the quality metric. Alternatively, or in addition, the method 600 may iterate on the design, making one or more automatic modifications, in an attempt to increase the quality metric.

At step 670, the method 600 ends until another circuit design is received at step 620.

Figure 7:
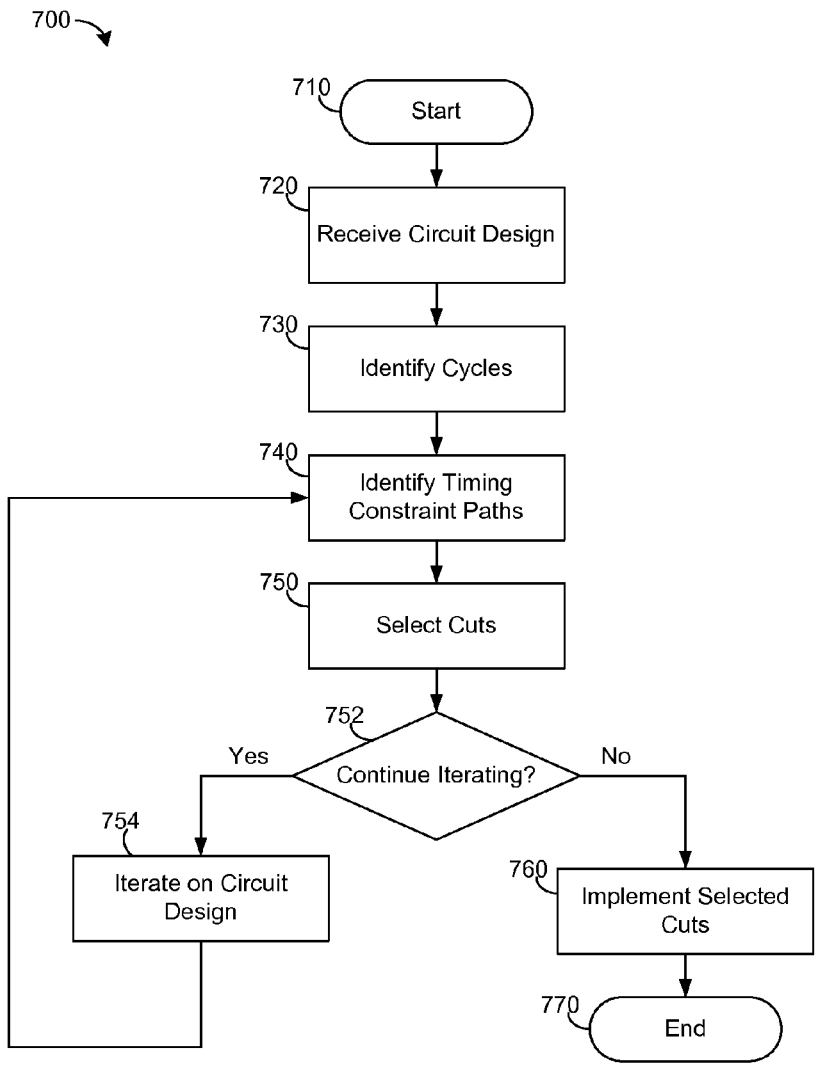
FIG. 7 is a flow diagram of another embodiment of a method for cycle cutting with timing path analysis.

FIG. 7 is a flow diagram of another embodiment of a method 700 for processing a cyclic circuit design using timing path analysis. As described above, the method 700 may be embodied as one or more executable instructions stored on a non-transitory machine-readable storage medium. One or more of the steps of the method 700 may be tied to particular machine components, such as a processor, communication interfaces, or the like.

At steps 710-750, the method 700 is initialized, receives a circuit design, identifies cycles in the circuit design, identifies timing constraint paths in the circuit design, and selects cycle cuts as described above in conjunction with FIG. 6.

At step 752, the method 700 determines whether to continue iterating on the circuit design. Step 752 may comprise calculating a quality metric, which, as described above, may be based on the number of uncut cycles and/or the number of orphaned elements resulting from the cuts selected at step 750. Step 752 may comprise comparing the quality metric to a threshold; if the quality metric satisfies the threshold, the flow may continue to step 760; otherwise, the flow may continue to step 754. Alternatively, or in addition, step 752 may comprise an optimization technique, in which quality metrics of previous iterations are compared to a quality metric of the current iteration (e.g., or to a quality metric trend). The number of iterations performed by the method 700 may be limited by an iteration threshold.

At step 754, the method 700 iteratively modifies the circuit design by one or more of: notifying the circuit designer and/or requesting a modification of one or more timing constraints, or the like; automatically relaxing one or more timing constraints in the circuit design; automatically relaxing one or more element sizing constraints in the design; segmenting the design into two or more partitions, each of which may be processed separately; modifying one or more timing paths (e.g., segmenting a timing path as described above in conjunction with FIG. 5); or the like. The modifications of step 754 may be manual (e.g., applied by a circuit designer) and/or automatic (e.g., automatically applied by the method 700). Following the modification(s) of step 754, the flow continues at steps 730-750 where a new set of circuit cycles and timing constraint paths are identified, and new cycle cuts are selected.

At steps 760 and 770, the cuts selected at set 750 may be implemented, and the flow may end until a next circuit design is received.

Reference throughout this specification to "some embodiments" or an "embodiment" means that a particular feature, structure, or characteristic described in connection with the embodiment is included in at least one embodiment. Thus, the appearance of the phrases "in one embodiment" or "in some embodiments" in various places throughout this specification are not necessarily all referring to the same embodiment.

Furthermore, an "embodiment" may be a system, a device, an article of manufacture, a method, and/or a process.

The phrases "connected to," "networked," and "in communication with" "communicatively coupled to" refer to any form of interaction between two or more entities, including mechanical, electrical, magnetic, and electromagnetic interactions. Two components may be connected to each other even though they are not in direct physical contact with each other and even though there may be intermediary devices between the two components.

Some of the infrastructure that can be used with embodiments disclosed herein is already available, such as: general-purpose processors, programming tools and techniques, machine-readable storage media, and communications networks and interfaces. A computing device, such as an IED and/or monitoring device, may include a processor, such as a microprocessor, microcontroller, logic circuitry, or the like. The processor may include a special purpose processing device, such as an ASIC, PAL, PLA, PLD, FPGA, or other processing means. The computing device may also include a computer-readable storage medium, such as non-volatile memory, static RAM, dynamic RAM, ROM, CD-ROM, disk, tape, magnetic, optical, flash memory, or other non-transitory machine-readable storage medium.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for circuit design cycle cutting using timing path analysis, the method comprising:
   using a computing device to perform the steps of:
      accessing a circuit design comprising a plurality of elements, interconnected by a plurality of edges, the circuit design further comprising timing constraints specified by a designer;
      identifying cycles in the circuit design;
      marking constrained edges by, for each timing constraint of the circuit design;
         identifying a set of timing paths in the circuit design that satisfy a timing constraint,
         selecting a timing constraint path from the identified set of timing paths using a greatest common path heuristic by identifying a shortest common path in the set of timing constraint paths, and
         marking input edges of elements in the selected timing constraint path as constrained;
      selecting cycle cuts to cut one or more of the identified cycles in the circuit design, the selection configured to preserve the timing constraints specified by the designer; and
      generating a directive to cause a computer-aided design (CAD) tool to implement the one or more selected cycle cuts.

2. The method of claim 1, further comprising providing the directive to the CAD tool, the CAD tool to perform static timing analysis on the circuit design using the directive.

3. The method of claim 1, wherein the directive is configured to cause the CAD tool to remove a timing arc passing through an element of the circuit design.

4. The method of claim 1, wherein the directive is configured to cause the CAD tool to disable a timing path through an element of the circuit design.

5. The method of claim 1, further comprising:
   identifying a must-cut timing path in the circuit design; and
   generating a directive to cut the identified must-cut timing path.

6. The method of claim 5, wherein the must-cut timing path corresponds to a global architectural cycle.

7. The method of claim 1, wherein identifying cycles comprises traversing edges of the circuit design, wherein a cycle is identified when a traversal comprising a first element returns to the first element.

8. The method of claim 1, wherein identifying cycles comprises:
   constructing a data structure comprising representations of the elements of the circuit design and representations of the edges interconnecting the elements; and
   searching of the data structure to identify cycles in the circuit design.

9. The method of claim 1, wherein selecting the timing constraint path comprises generating a plurality of timing constraints from a non-GCP timing path in the circuit design.

10. The method of claim 1, wherein selecting a cycle cut comprises:
    identifying a set of edges interconnecting elements in the cycle, wherein cutting any of the edges cuts the cycle; and
    selecting an edge in the identified set of edges for the cycle cut that is not marked as constrained.

11. The method of claim 1, wherein selecting cycle cuts for a plurality of cycles comprises:
    identifying a set of edges for each of a plurality of cycles identified in the circuit design, each set of edges interconnecting the elements in a respective cycle, wherein cutting any of the edges cuts the respective cycle; and
    selecting an edge in the set of edges that cuts a plurality of cycles and is not marked as constrained.

12. The method of claim 11, further comprising selecting the edge to maximize a number of cycles cut by the edge.

13. The method of claim 1, wherein the cycle cut is selected to prevent orphaning an element in the circuit design.

14. The method of claim 1, further comprising calculating a quality metric based on a number of cycles remaining uncut in the circuit design and a number of orphaned elements in the circuit design.

15. A machine-readable storage medium comprising instructions which when executed cause a machine to perform a method for cycle cutting using timing analysis, the method comprising:
    identifying a plurality of cycles in the circuit design by traversing a data structure comprising elements of the circuit design interconnected by edges of the circuit design;
    marking constrained edges by, for each timing constraint of the circuit design,
       identifying a set of timing paths in the circuit design that satisfy the timing constraint, selecting a timing constraint path from the set of identified timing paths using a greatest common path heuristic by identifying a shortest common path in the set of timing constraint paths, and
       marking an input edge of each element on the selected timing constraint path as constrained;

selecting cuts to cut one or more of the identified cycles in the circuit design, each of the cuts selected to prevent cutting edges marked as constrained; and providing the selected cuts to a computer-aided design (CAD) tool.

16. The machine-readable storage medium of claim 15, wherein the selected cuts are selected to prevent orphaning an element of the circuit design.

17. The machine-readable storage medium of claim 15, the method further comprising calculating a quality metric of the selected cuts based on a number of identified cycles remaining uncut and a number of orphaned elements resulting from the selected cuts.

18. A system for cycle cutting using timing analysis, comprising:

a circuit design comprising one or more cycles to be processed by a computer-aided design (CAD) tool, the CAD tool correctly processing acyclic circuit designs;

a computing device comprising a processor; and a cyclical timing module executed by the processor of the computing device, the cyclical timing module configured to identify a plurality of cycles in the circuit design by traversing a data structure comprising elements of the circuit design interconnected by edges of the circuit design, and to mark constrained edges of the circuit design by, for each timing constraint of the circuit design, the cyclical timing module is configured to identify a set of one or more timing paths in the circuit design that satisfy the timing constraint, select a timing constraint path from the set of identified timing paths using a greatest common path heuristic by identifying a shortest common path in the set of one or more timing constraint paths, and mark an input edge of each element on the selected timing constraint path as constrained, the cyclical timing module further configured to select cuts to cut one or more of the identified cycles, wherein each cut is selected to prevent cutting edges marked as constrained, and to provide the cuts to the CAD tool.

\* \* \* \* \*